No. 865,872. PATENTED SEPT. 10, 1907.
T. S. CRANSTON.
CASING HEAD.
APPLICATION FILED JAN. 24, 1907.

WITNESSES
William P. Goebel.

INVENTOR
Thaddeus S. Cranston
BY Munn & Co
ATTORNEYS

UNITED STATES PATENT OFFICE.

THADDEUS STEVENS CRANSTON, OF NEW COMERSTOWN, OHIO.

CASING-HEAD.

No. 865,872.  Specification of Letters Patent.  Patented Sept. 10, 1907.

Application filed January 24, 1907. Serial No. 353,900.

*To all whom it may concern:*

Be it known that I, THADDEUS STEVENS CRANSTON, a citizen of the United States, and a resident of New Comerstown, in the county of Tuscarawas and State of Ohio, have invented a new and Improved Casing-Head, of which the following is a full, clear, and exact description.

This invention is an improvement in casing heads for oil and gas wells or the like, and has for an object among others, to provide a head that will be gas or oil-tight when under extreme pressures, especially avoiding the use of gaskets or packings which are not only expensive but ordinarily permit the gas or oil to seep through the material of which they are composed under high pressure, in such quantities as to result in material loss. By my invention this objection is overcome by the novel construction hereinafter described.

Reference is to be had to the accompanying drawings forming a part of this specification, in which similar characters of reference indicate corresponding parts in all the figures.

Figure 1:
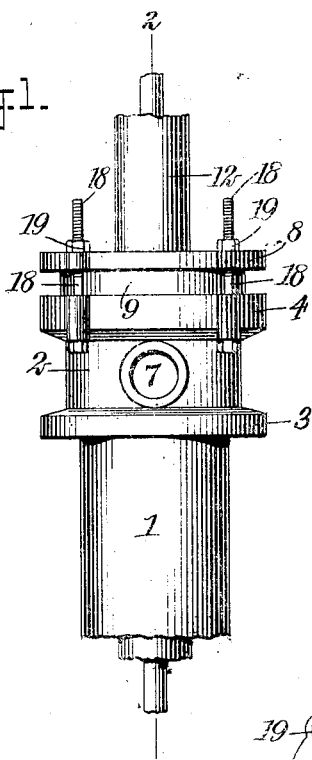
Figure 2:
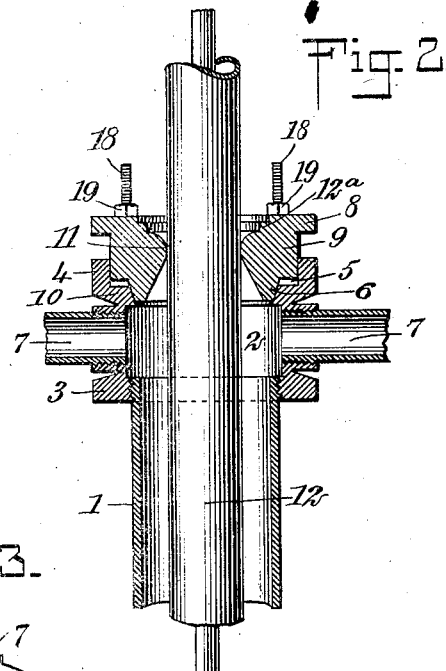
Figure 3:
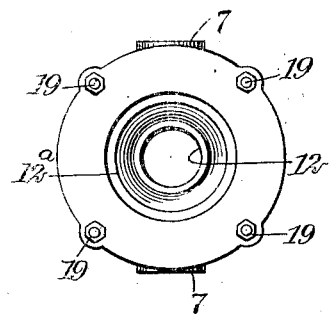
Figure 4:
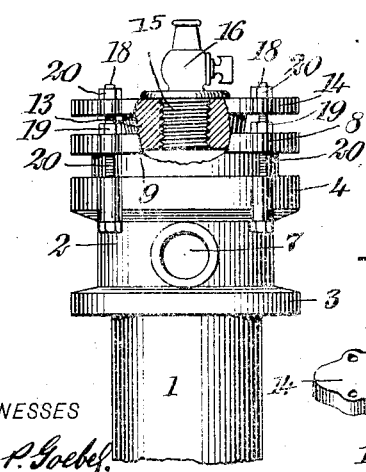
Figure 5:
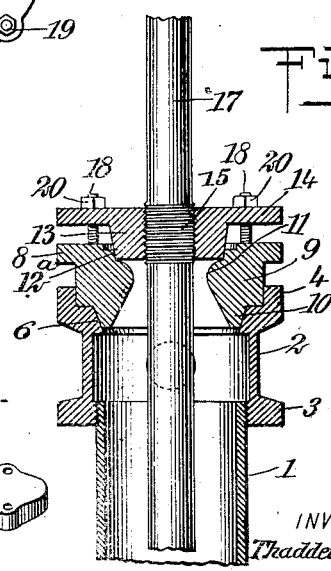
Figure 6:
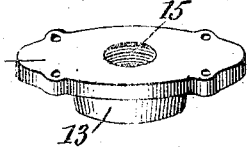

Figure 1 is a side elevation of my improved casing head applied to the well casing; Fig. 2 is a central, longitudinal section of the same on the line 2—2 of Fig. 1; Fig. 3 is a plan of the construction shown in Figs. 1 and 2; Fig. 4 is an elevational view, partly in section, of the casing head, with a cap applied thereto, having a stop-cock or valve screwed into the top thereof, as used in a flowing or oil well; Fig. 5 is a sectional view corresponding to Fig. 2 with the cap applied and the casing head employed in supporting a line of tubing, and Fig. 6 is a perspective view of the cap or cover.

1 indicates a well casing, which has threaded on its upper end my improved casing head, comprising a body or shell 2 preferably constructed with a flange 3 surrounding its lower threaded end and a somewhat heavier flange 4 at the upper end thereof. The upper end of the shell 2 is provided with an enlarged annular recess 5, with an adjacent conical seat 6 of somewhat lesser diameter and arranged below it, said seat being preferably turned to give it a true bearing surface. At opposite sides of the shell 2 it is formed with the usual gas or oil outlets 7.

8 indicates a ring forming a part of the casing head, having a cylindrical extension 9 of a diameter to fit the annular recess 5, and a conical portion 10 of reduced diameter projecting therefrom adapted to fit the conical seat 6 and form therewith an oil and gas-tight joint. The bore of the ring 8 is contracted at an intermediate point, as indicated at 11, forming a rounded seat through which tubing 12 may pass and fit, should tubing be used. The bore of the ring flares outwardly in passing downwardly from the seat 11, as clearly illustrated in Figs. 2 and 5. Above the contracted portion or seat 11, the bore of the ring is formed with a conical seat 12$^a$, adapted to receive and fit a conical projection 13 extending from the under face of a cap or cover 14. The center of this cap and its conical extension is provided with a screw-threaded opening 15 for receiving the screw-threaded shank of a stop-cock or valve 16, as illustrated in Fig. 4. Should the head be used on a flowing oil well, the screw-threaded opening 15 may be employed to support a line of tubing 17, as shown in Fig. 5.

For securing the shell 2 and ring 8 together, I preferably employ bolts or studs 18, which pass vertically through their flanges, and have nuts 19 threaded thereon for forcing the conical portion 10 firmly against the seat 6, and forming a joint therebetween which will be gas or oil-tight under extreme pressures. The bolts 18 are extended above the ring 8 a sufficient distance to pass through the cap or cover when this part of the head is in use. The conical extension of the cap 14 is likewise forced to its seat 12$^a$ by nuts 20 threaded on the upper ends of said bolts.

Although I have described the preferred form of my invention, I regard the precise embodiment as not material and the scope thereof limited by the annexed claims only.

Having thus described my invention I claim as new and desire to secure by Letters Patent:

1. A casing head comprising a body or shell having an outlet formed in the side thereof, a conical seat formed in the upper portion of the body, a ring having a conical extension fitting said seat, and bolts axially forcing the shell and ring together.

2. A casing head comprising a body or shell adapted to be secured to the upper end of a well casing and having an outlet formed in the side thereof, said shell having an enlarged annular recess with an adjacent conical seat in its upper end, a ring having a cylindrical extension provided with a conical projection adapted to fit said recess and seat, and means for axially drawing the shell and ring together.

3. A casing head comprising a shell having a conical seat, a ring having a conical projection adapted to fit said seat, said ring also having a conical seat, a cap having a conical extension to fit the seat of the ring, and means for drawing the shell, ring and cap together.

4. A casing head comprising a shell or body having the lower end thereof internally screw-threaded, the opposite end of said shell being provided with an enlarged, annular recess with an adjacent conical seat, a ring having a cylindrical extension with a conical projection formed thereon adapted to fit said recess and seat, and means for forcing the ring and shell together in an axial direction.

5. A casing head comprising a shell or body having an enlarged annular recess in the upper end thereof with an adjacent conical seat, a ring having a cylindrical extension formed with a conical projecting portion adapted to fit said recess and seat, said ring being formed with a bore contracted at a point intermediate its length, and means for forcing the ring and shell together in an axial direction.

6. A casing head comprising a shell or body having a conical seat near the upper end thereof, a ring having a conical projection adapted to fit said seat, said ring also having a conical seat near its upper end, a cap having a centrally threaded opening and a conical extension surrounding said opening adapted to fit the conical seat of the ring, and means for drawing the shell, ring and cap together.

7. A casing head comprising a shell having external flanges at each end thereof, said-shell being internally threaded at its lower end and formed with an enlarged annular recess and an adjacent conical seat at its upper end, a ring having a cylindrical extension with a conical projection formed thereon adapted to fit said recess and seat, said ring also having a conical seat near its upper end, a cap having a centrally threaded opening and a conical extension adapted to fit the seat in the ring, and bolts connecting the shell, ring and cap adapted to draw them together.

In testimony whereof I have signed my name to this specification in the presence of two subscribing witnesses.

THADDEUS STEVENS CRANSTON.

Witnesses:
 FRANK H. MURPHY,
 D. O. NICODENES.